(12) United States Patent
Camberlin et al.

(10) Patent No.: US 6,573,331 B1
(45) Date of Patent: Jun. 3, 2003

(54) GRAFTED BLOCK POLYMERS CONTAINING AT LEAST A POLYOLEFIN OR POLYDIENE SEQUENCE COMPRISING A SUCCINIMIDE CYCLE SUBSTITUTED ON NITROGEN

(75) Inventors: Yves Camberlin, Caluire (FR); Jacky Grenier, Vignieu (FR); Serge Gonzalez, Decines (FR); Jacques Vallet, Lyons (FR)

(73) Assignee: Institut Francais du Petrole (FR)

( * ) Notice: Subject to any disclaimer, the term of this patent is extended or adjusted under 35 U.S.C. 154(b) by 0 days.

(21) Appl. No.: 09/719,225

(22) PCT Filed: May 19, 1999

(86) PCT No.: PCT/FR99/01190

§ 371 (c)(1),
(2), (4) Date: Feb. 12, 2001

(87) PCT Pub. No.: WO99/64478

PCT Pub. Date: Dec. 16, 1999

(30) Foreign Application Priority Data

Jun. 10, 1998 (FR) .............................. 98 07401

(51) Int. Cl.⁷ .............................. C08F 8/00; C08F 8/30; C08F 291/00
(52) U.S. Cl. ................. 525/88; 525/92 R; 525/242; 525/284; 525/285; 525/293; 525/314; 525/327.6
(58) Field of Search .............................. 525/92 R, 242, 525/284, 285, 293, 314, 327.6, 88

(56) References Cited

U.S. PATENT DOCUMENTS 5,338,802 A    8/1994   DuBois
5,461,116 A   10/1995   Hoxmeier

FOREIGN PATENT DOCUMENTS

| DE | 4333670 A  |   | 4/1995  |
|----|------------|---|---------|
| DE | 19502206 A |   | 8/1996  |
| DE | 19519855 A |   | 12/1996 |
| DE | 19610362 A |   | 9/1997  |
| EP | 438240 A   |   | 7/1991  |
| JP | 06001816 A |   | 1/1994  |
| JP | 06-1816    | * | 6/1994  |

OTHER PUBLICATIONS

Yoshiharu, electronic translation of JP 06–1816.*

* cited by examiner

*Primary Examiner*—Jeffrey Mullis
(74) *Attorney, Agent, or Firm*—Mellon, White, Zelano, Branigan, P.C.

(57) ABSTRACT

Graft stereoblock polymers are described which contain at least one polyolefin or polydiene type sequence comprising at least one succinimide ring substituted on the nitrogen atom by a reactive group with formula —R(—X)$_n$, where —X represents a reactive group, n is a number greater than or equal to 1 and —R is a residue containing at least one carbon atom, and containing at least one sequence of a variety of natures, different from a polyolefin or polydiene. Their preparations and uses are also described. Mixtures of polymers comprising at least two polymers which are different from each other, at least one of which is a graft stereoblock polymer as defined above, and their uses, are also described.

21 Claims, No Drawings

GRAFTED BLOCK POLYMERS CONTAINING AT LEAST A POLYOLEFIN OR POLYDIENE SEQUENCE COMPRISING A SUCCINIMIDE CYCLE SUBSTITUTED ON NITROGEN

FIELD OF THE INVENTION

The invention relates to stereoblock polymers containing at least one saturated or unsaturated polyolefin type sequence, or a polydiene, which may be linear or branched, comprising at least one succinimide ring substituted on the nitrogen atom by a reactive group, said ring being supported either by the main chain, or by a side chain, and containing at least one sequence with a variety of natures, other than a polyolefin. The polymers used to prepare the polymers of the invention are of the thermoplastic elastomeric type and are bi-, tri- or multi-sequenced.

The invention also relates to mixtures of a plurality of graft stereoblock polymers as defined above and to mixtures of such graft stereoblock polymers with other polymers, such as polyamide, polyether, polyolefin or polyurethane type polymers. It is possible to add substances to the mixture to obtain properties which are appropriate for the desired applications. European patent EP-A2-0 295 706 mentions those different substances and should be considered to be incorporated by reference. By way of example, the mixture of polymers can contain stabilisers, such as antioxidants or ultraviolet absorbers, lubricants, colorants, flame retarders, nucleation agents, paraffinic or naphthenic oil type plasticizers, reinforcing fibres which increase the value of the Young's modulus and the break strength, such as glass fibres, carbon fibres, boron fibres, or ceramic fibres, or organic or inorganic fillers, such as titanium dioxide or zinc oxide.

BACKGROUND OF THE INVENTION

Regarding the current state of the art, the article in the "Journal of Applied Polymer Science", 1997, vol. 63, n°3, pages 275–281 shows that adding a small quantity of a polyolefin grafted by a maleic anhydride in a PE-BD (low density polyethylene)/PP(polypropylene)) mixture improves the compatibility between those two polymers, which are initially non miscible. A further method for improving compatibility consists in introducing a copolymer between the two incompatible polymer phases, to improve the mechanical properties of the mixture obtained. In a further article in the "Journal of Applied Polymer Science", 1997, vol. 65, n°2, pages 2457–2469, a PBT/EVA, [poly(butylene-terephthalate)/(ethylene-vinyl acetate copolymer)] graft copolymer renders PE/PBT [polyethylene/poly(butylene-terephthalate) mixtures compatible. Increasing the number of vinyl acetate units in an EVA copolymer increases the compatibility with PE. Adding a copolymer containing elements which are miscible with the components of the mixture changes the morphology of the system. The PBT particle size is reduced, which encourages compatibility between the two phases.

SUMMARY OF THE INVENTION

The present invention relates to modified polymers containing a reactive group which is grafted onto a polyolefin or a polydiene, to improve the dispersion and adhesive properties. They are graft stereoblock polymers which have improved adhesive properties compared with non grafted stereoblock polymers. In particular, they can be used as adhesives, compatibilisers or resiliency agents.

DETAILED DESCRIPTION OF THE INVENTION

The graft stereoblock polyolefin or polydiene type polymers of the invention have reactive groups which enable them to be used for the production of mixtures of polymers. They contain at least one succinimide ring substituted on the nitrogen atom by a reactive group, said ring being supported either by the main chain, or by a side chain, resulting from the reaction of at least one stereoblock polymer with a compound comprising at least one maleimide ring substituted on the nitrogen atom by a reactive group with formula —R(—X)$_\square$, where —X represents a reactive group, n is a number which is greater than or equal to 1 and —R is a residue containing at least one carbon atom; also included are polymers which derive therefrom by reaction with at least one polyepoxide containing at least two epoxy groups in its molecule. The compound comprising a maleimide ring is represented by formula (I) below:

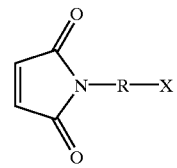

Formula (I)

Reactive group —X is normally selected from a hydroxyl group, a carboxyl group, a carboxamide group, a carboxylic acid halide group, a thiol group, a thiocarboxyl group, an amino group, a halogen, an epoxy group, or an esterified carboxyl group, the ester portion of which comprises a reactive group. When a plurality of —X groups are present, they can be identical or different.

This reactive group is usually either selected from groups which can react with epoxy functions by oxirane ring opening, in the case of a residue containing at least one polyepoxide, or selected from the carboxyl group, the carboxamide group and acid halide groups, for example a carboxylic acid chloride. The preferred group is the carboxyl group.

The —R— group is normally selected from substituted or non substituted, saturated or unsaturated aliphatic hydrocarbon groups, and substituted or non substituted aromatic groups. In general, non substituted groups are preferred, usually groups comprising at least one aromatic nucleus. Examples of frequently used groups are benzene groups bonded ortho-, meta- or para- to the nitrogen atom and to the reactive group —X. Usually, the para- or meta- form is used.

The polyepoxide used in the present invention containing at least two epoxy groups in its molecule, is usually selected from the group formed by aliphatic polyepoxides, cycloaliphatic polyepoxides and aromatic polyepoxides. Examples of compounds which are usually used are the diglycidylether of bis-phenol-A or bis-phenol-F, triglycidylether-isocyanurate and/or triglycidylether-cyanurate and/or triglycidyl-isocyanurate and/or triglycidyl-cyanurate or novolac epoxides, or mixtures of at least two of these compounds. The epoxy compounds comprising at least two epoxy groups cited in United States patent U.S. Pat. No. 4,921,047 are also suitable in the present invention. The teaching of that patent should hereby be considered to have been incorporated by reference.

The sequence for grafting the graft stereoblock polymers is a polyisoprene, polybutadiene, poly(ethylene-butylene), poly(ethylene-propylene) or other polyolefins and is optionally grafted via polyisoprene or polybutadiene links.

The sequences other than the polyolefin or polydiene type contained in the stereoblock polymers of the present invention are of a variety of natures. They are obtained by conventional polymerisation routes which are well known to the skilled person—by addition, by condensation, or by ring opening. Non limiting examples are polystyrenes, polyvinyls and their derivatives, such as polyvinyl halides, polyvinylacetals, polyvinylacetates, polyvinyl alcohols, polyvinyl esters or polyvinyl ethers, polysulfides, including polyphenylene sulfides, polyacrylonitriles, polyethers, including polyalkylene oxides and polyphenyl ethers, polyesters, polyacrylic acids, polyamides, including polyacrylamides, polyimides, including polyether imides, polyamide imides, polyurethanes, polyureas, polyurethane ureas, polyester urethanes, polyether urethanes, polysulfones, polyketones, aromatic polyesters, including polycarbonates, polyethylene glycols, polyacrylates and polymethacrylates, polysiloxanes, polyether sulfones, polyether ketones, organometallic polymers, such as silicones, and polymers containing phosphorous or other heteroatoms.

The graft stereoblock polymers of the present invention are prepared using different methods. A first method consists of bringing a stereoblock polymer containing at least one sequence of a variety of natures and at least one polyolefin or polydiene type sequence into contact in the molten state with at least one compound comprising a maleimide ring substituted on the nitrogen atom by a reactive group, in a kneader or extruder, to produce a graft stereoblock polymer.

Bringing a stereoblock polymer containing at least one sequence of a variety of natures and at least one polyolefin or polydiene type sequence in the molten state into contact with at least one compound comprising a maleimide ring substituted on the nitrogen atom by a reactive group and at least one compound containing at least two epoxy groups in its molecule in a kneader or extruder can also produce graft stereoblock polymers.

This type or preparation can be carried out with or without a radical initiator. Examples of radical initiators are peroxides. Within the context of the present invention, it is preferable to work without a radical initiator. This possibility of forming polymers containing a succinimide ring substituted on the nitrogen atom by a reactive group without a radical initiator, said ring being supported either by the main chain or by the side chain, is a distinct advantage of the present invention, which avoids risks of cleavage and cross-linking of the polymer. The reaction temperature is normally in the range from the melting temperature of the polymer to about 300° C. Usually, this temperature is about 200° C. to about 260° C. The reaction time is relatively short and normally does not exceed 10 minutes. Normally, an extrusion-reaction system is preferably used, with very good results.

A further method for preparing the graft stereoblock polymers of the present invention consists in a step a) for bringing a stereoblock polymer containing at least one sequence of a variety of natures and at least one polyolefin or polydiene type sequence into contact in the molten state with at least one compound comprising a maleimide ring substituted on the nitrogen atom by a reactive group in a kneader or in an extruder, then in a step b), introducing at least one compound containing at least two epoxy groups in its molecule into the kneader or extruder. This preparation can be carried out with or without using a radical initiator. Examples of radical initiators are peroxides. Within the context of the present invention, it is preferable to work without a radical initiator. This possibility of forming polymers containing a succinimide ring substituted on the nitrogen atom by a reactive group without a radical initiator, said ring being supported either by the main chain or by the side chain, is a distinct advantage of the present invention, avoids risks of cleavage and cross-linking of the polymer. The reaction temperature in step a), as in step b), is normally in the range from the melting temperature of the polyolefin to about 300° C. Usually, this temperature is about 200° C. to about 260° C. The reaction time is relatively short and normally does not exceed 10 minutes for each of the steps. Normally, an extrusion-reaction system is preferably used, with very good results. The temperature is normally identical in both steps.

The present invention also relates to mixtures comprising at least two polymers which are different from each other, at least one of which is a graft stereoblock polymer comprising at least one polyolefin or polydiene type sequence with at least one succinimide ring substituted on the nitrogen atom by a reactive group and other sequences of a variety of natures, as described above, or a polymer prepared using one of the preparation methods described above. The reactive function present in the graft stereoblock polymer improves the formation of said mixtures. These mixtures are used for the production of adhesives, as the mixtures have better adhesive properties than those of mixtures of polymers containing non grafted stereoblock polymers. They are also used for the production of products obtained by different transformation processes such as extrusion, injection or calendering and other transformation processes, or for the production of multilayered materials, adhesives or resiliency agents.

The mechanical properties change with the proportion of the different sequences in the graft stereoblock polymer. If the proportion of graft polyolefin is low and the other sequences represent polymers with rigid mechanical properties, the graft stereoblock polymer is shock resistant.

The entire disclosure of all applications, patents and publications, cited above and below, and of corresponding French application 98/07401, filed Jun. 10, 1998, are hereby incorporated by reference.

The following examples illustrate the invention without limiting its scope.

EXAMPLE 1

45 grams (g) of SEBS (styrene-ethylene/butylene-styrene) thermoplastic elastomer, sold by Asahi Chemical Industry Co. Ltd under the trade name TUFTEC H1041® with a density of 0.91, measured using the ASTM D297 method, and 0.45 g of 4-maleimidobenzoic acid (MBA) were introduced into a Haake Rheocord® kneader.

The working temperature was 240° C.; the blade rotation rate was 64 rotations per minute (rpm). After 5 minutes (min) of kneading at 240° C., the kneaded product was air cooled and dried at 60° C. under 1 millimeter (mm) of mercury for 8 hours. The results of adhesion tests carried out on the product obtained are shown in Table 1 below.

EXAMPLE 2

44 g of a thermoplastic elastomer sold by Asahi Chemical Industry Co. Ltd under the trade name TUFTEC H1041 ®, 0.44 g of MBA and 2.02 g of ARALDITE GT7071® sold by Ciba-Geigy (with an epoxy index of 2 and an epoxy equivalent of 500) were introduced into a Haake Rheocord® kneader.

The working temperature was 240° C.; the blade rotation rate was 64 rpm. After 5 min of kneading at 240° C., the kneaded product was air cooled and dried at 60° C. under 1 millimeter of mercury for 8 hours. The results of adhesion tests carried out on the product obtained are shown in Table 1 below.

EXAMPLE 3

This example describes the preparation of a graft polymer in a kneader in two successive steps.

44 g of SEBS sold by Asahi Chemical Industry Co. Ltd under the trade name TUFTEC H1041® and 0.44 g of MBA were introduced into a Haake Rheocord® kneader.

The working temperature was 240° C.; the blade rotation rate was 64 rpm. After 2 min of kneading at 240° C., 2.02 g of ARALDITE GT7071® was added and the temperature was maintained at 240° C. for another 5 minutes after that addition. The product obtained from this second step was cooled in water and dried at 60° C. under 1 mm of mercury for 8 hours. The results of adhesion tests carried out on the product obtained are shown in Table 1 below.

EXAMPLE 4

The procedure of Example 1 was repeated, using 45 g of SEBS sold by Asahi Chemical Industry Co. Ltd under the trade name TUFTEC H1042® with a density of 0.89, measured using the ASTM d297 method, and 0.45 g of MBA. The results of adhesion tests carried out on the product obtained are shown in Table 1 below.

EXAMPLE 5

The procedure of Example 2 was repeated, using 44 g of SEBS sold by Asahi Chemical Industry Co. Ltd under the trade name TUFTEC H1042®, with 0.44 g of MBA and 2.02 g of ARALDITE GT7071®. The results of adhesion tests carried out on the product obtained are shown in Table 1 below.

EXAMPLE 6

The procedure of Example 1 was repeated, using 45 g of SEBS sold by Asahi Chemical Industry Co. Ltd under the trade name TUFTEC H1052® with a density of 0.89, measured using the ASTM D297 method, and 0.45 g of MBA. The results of adhesion tests carried out on the product obtained are shown in Table 1 below.

EXAMPLE 7

The procedure of Example 2 was repeated, using 44 g of SEBS sold by Asahi, Chemical Industry Co. Ltd under the trade name TUFTEC H1052®, with 0.44 g of MBA and 2.02 g of ARALDITE GT7071®. The results of adhesion tests carried out on the product obtained are shown in Table 1 below.

EXAMPLE 8

The procedure of Example 2 was repeated, using 44 g of SEBS sold by Asahi Chemical Industry Co. Ltd under the trade name TUFTEC H1052®, with 0.44 g of MBA and 2.44 g of ARALDITE ECN9699®, sold by Ciba-Geigy (epoxy index 4.65). The results of adhesion tests carried out on the product obtained are shown in Table 1 below.

EXAMPLE 9

The procedure of Example 1 was repeated, using 45 g of SEBS sold by Asahi Chemical Industry Co. Ltd under the trade name TUFTEC H1075® with a density of 0.89, measured using the ASTM D297 method, and 0.45 g of MBA. The results of adhesion tests carried out on the product obtained are shown in Table 1 below.

EXAMPLE 10

The procedure of Example 2 was repeated, using 44 g of SEBS sold by Asahi Chemical Industry Co. Ltd under the trade name TUFTEC H1075®, with 0.44 g of MBA and 2.02 g of ARALDITE GT7071®. The results of adhesion tests carried out on the product obtained are shown in Table 1 below.

EXAMPLE 11

This example describes a mixture formed from a graft stereoblock polymer and an elastomer. 30 g of SEBS sold by Asahi Chemical Industry Co. Ltd under the trade name TUFTEC H1052® and 10 g of the product of Example 6 were introduced into a Haake Rheocord® kneader.

The working temperature was 240° C.; the blade rotation rate was 64 rpm. After 5 min of kneading at 240° C., the kneaded product was air cooled and dried at 60° C. under 1 mm of mercury for 8 hours. The results of adhesion tests carried out on the product obtained are shown in Table 1 below.

EXAMPLE 12

The procedure of Example 11 was repeated, using 30 g of SEBS sold by Asahi Chemical Industry Co. Ltd under the trade name TUFTEC H1052® and 10 g of the product of Example 7. The results of adhesion tests carried out on the product obtained are shown in Table 1 below.

EXAMPLE 13

45 g of butadiene-styrene copolymer sold by Negromex under the trade name HOUSMEX TR1110® and 0.45 g of MBA were introduced into a Haake Rheocord® kneader.

The working temperature was 200° C.; the blade rotation rate was 32 rpm. After 5 minutes (min) of kneading at 200° C., the kneaded product was air cooled and dried at 60° C. under 1 millimeter (mm) of mercury for 8 hours. The results of adhesion tests carried out on the product obtained are shown in Table 1 below.

EXAMPLE 14

This Example describes the preparation of a polymer using a CLEXTRAL BC21® co-rotating twin screw extruder with a length to diameter ratio of 28. The screw diameter was 25 millimetres (mm) and the extruder was provided with a die with a 4 mm diameter.

Granules of SEBS sold by Asahi Chemical Industry Co. Ltd under the trade name TUFTEC H1042® were introduced into the feed hopper. The rate at which the granules were introduced into the extruder was 5 kilograms per hour (kg/h).

Simultaneously, a metering hopper was used to introduce powdered K-TRON sold under the trade name KM-T20® and an equimolar mixture of MBA and ARALDITE GT7071® into the feed hopper of the machine. The flow rate of the powder was 0.2 kg/h. The total flow rate of the products was 5.2 kg/h. The temperature in the extruder was maintained at 240° C., and the screw rotation speed was 100 rpm. The residence time was 1 minute. The rod which left the die was cooled in water at 25° C. It was granulated and dried.

EXAMPLE 15

Adhesion tests were carried out on the various products prepared in Examples 1 to 14 using ACIER XC 35 metallic test pieces.

The adhesive properties and the compositions were determined using the ASTM D1002 method.

The test procedure followed including preparing the metallic test pieces.

Each test piece was cleaned by dipping it in petroleum ether, then scoured using a wire brush.

An adhesion surface 25.4×12.7 mm was delimited on the test piece and a maximum adhesive joint thickness of $125 \times 10^{-6}$ m was set using a block. Two test pieces were adhered using a preheated DARRAGON® plate press, applying a pressure of 0.5 MPa for 1 minute.

A traction test was then carried out using an INSTRON® machine provided with a measuring head of $10^5$ Newton. The rate of displacement of the cross-beam was 1 mm/min.

The results of the adhesion tests are shown in Table 1 below. The values given correspond to the average value obtained over 10 successive tests. For comparison, tests were carried out on the commercial products used to produce the products of the invention, on a thermoplastic elastomer sold by Shell under the trade name KRATON G 1901X® and on butadiene-styrene sold by Negromex under the trade name HOUSMEX 1110®.

TABLE 1

| REFERENCE | ADHESION TEMPERATURE (° C.) | MAXIMUM LOAD (kN) | NATURE OF BREAK |
|---|---|---|---|
| TUFTEC H1041 | 250 | 0.43 | Adhesive |
| TUFTEC H1042 | 250 | 0.17 | Adhesive |
| TUFTEC H1052 | 250 | 0.34 | Adhesive |
| TUFTEC H1052 | 220 | 0.46 | Adhesive |
| TUFTEC H1075 | 250 | 0.34 | Adhesive |
| KRATON G1901X | 240 | 1.32 | Adhesive |
| BUTADIENE STYRENE | 220 | 0.015 | Adhesive |
| Example 1 | 250 | 0.47 | Cohesive |
| Example 2 | 250 | 0.45 | Cohesive |
| Example 3 | 250 | 0.45 | Cohesive |
| Example 4 | 250 | 0.6 | Cohesive |
| Example 5 | 250 | 0.4 | Cohesive |
| Example 6 | 250 | 0.7 | Cohesive |
| Example 6 | 220 | 1.24 | Cohesive |
| Example 7 | 250 | 0.9 | Cohesive |
| Example 7 | 220 | 1.25 | Cohesive |
| Example 8 | 240 | 1.49 | Cohesive |
| Example 9 | 250 | 0.36 | Cohesive |
| Example 10 | 250 | 0.36 | Cohesive |
| Example 11 | 220 | 1.18 | Cohesive |
| Example 12 | 220 | 0.49 | Cohesive |
| Example 13 | 220 | 0.1 | Cohesive |
| Example 14 | 250 | 1.11 | Cohesive |

The substantial increase in the maximum load required to cause breakage using the products of the present invention can be seen, also the difference in the nature of the break which occurred in the bulk and demonstrates the substantial improvement in adhesion obtained with the products of the invention.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A graft block polymer comprising:
    at least one polyolefin or polydiene sequence comprising at least one succinimide ring substituted on the nitrogen atom by a reactive group with formula —R(—X)$_n$, where —X is a carboxyl group, n is a number greater than or equal to 1 and —R is a residue containing at least one carbon atom; and
    at least one other sequence which is different from said at least one polyolefin or polydiene sequence.

2. A polymer according to claim 1, in which the —R— group is selected from substituted or non substituted, saturated or unsaturated aliphatic hydrocarbon groups, and substituted or non substituted aromatic groups.

3. A polymer according to claim 1, in which —R is a benzene residue and the group —X is in the meta- or para-position with respect to the nitrogen atom.

4. A polymer according to claim 1, in which the polyolefin or polydiene sequence is selected from the group formed by polyisoprenes, poybutadienes, poly(ethylene-butylene), poly(ethylene-propylene), or other polyolefins and are optionally grafted by polyisoprene or polybutadiene links.

5. A polymer according to claim 1, in which said at least one other sequence is obtained by addition polymerization, condensation or ring opening.

6. A process for preparing a graft block polymer according to claim 1, comprising bringing a block polymer containing at least one polyolefin or polydiene sequence into contact in the molten state with at least one compound comprising a maleimide ring substituted on the nitrogen atom by a reactive group, in a kneader or extruder.

7. A polymer prepared in accordance with claim 6, in which the block polymer containing at least one polyolefin or polydiene sequence is a thermoplastic elastomer.

8. A graft block polymer prepared by reacting at least one polyepoxide containing at least two epoxy groups in its molecule with a polymer according to claim 1.

9. A polymer according to claim 8, in which the polyepoxide containing at least two epoxy groups in its molecule is selected from the group consisting of aliphatic polyepoxides, cycloaliphatic polyepoxides, aromatic polyepoxides and mixtures thereof.

10. A polymer according to claim 9, wherein said polyepoxides containing at least to epoxy in its molecule is selected from the group consisting of diglycidylether of bis-phenol-A, diglycidylether of bis-phenol-F, triglycidylether-isoecyanurate, triglycidylether-cyanurate, triglycidyl-cyanurate, triglycidyl-isocyanurate, novolac epoxides, or a mixture of at least two of these compounds.

11. A process for preparing a graft block polymer according to claim 8, comprising:
    in a step a), at least one polyolefin or polydiene sequence is brought into contact in the molten state with at least one compound comprising a maleimide ring substituted on the nitrogen atom by a reactive group in a kneader or in an extruder;
    then in a step b), at least one compound containing at least two epoxy groups in its molecule is introduced into the kneader or extruder.

12. An adhesive, comprising at least one polymer according to claim 1.

13. A compatibiliser, comprsing at least one polymer according to claim 1.

14. A resiliency agent, comprising at least one polymer according to claim 1.

15. A mixture of polymers, comprising at least two polymers which are different from each other, at least one of which is a polymer according to claim 1.

16. A multilayered material, comprising a mixture according to claim 15.

17. A graft block polymer according to claim 1, wherein said at least one other sequence is selected from polystyrenes and polyvinyls.

18. A graft block polymer according to claim 1, wherein said at least one other sequence is selected from polyvinyl halides, polyvinylacetals, polyvinylacetates, polyvinyl alcohols, polyvinyl esters, polyvinyl ethers, polysulfides, polyphenylene sulfides, polyacrylonitriles, polyethers, polyalkylene oxides, polyphenyl ethers, polyesters, polyacrylic acids, polyamides, polyacrylamides, polyimides, polyether imides, polyamide imides, polyurethanes, polyureas, polyurethane ureas, polyester urethanes, polyether urethanes, polysulfones, polyketones, aromatic polyesters, polycarbonates, polyethylene glycol, polyacrylates, polymethacrylates, polysiloxanes, polyether sulfones, polyether ketones, organometallic polymers, and polymers containing phosphorous.

19. In an adhesive comprising at least one polymer, the improvement wherein said polymer is in accordance with claim 1.

20. In a compatibiliser comprising at least one polymer, the improvement wherein said polymer is in accordance with claim 1.

21. In a resiliency agent comprising at least one polymer, the improvement wherein said polymer is according to claim 1.

* * * * *